United States Patent [19]

Kazawa et al.

[11] Patent Number: 5,434,886
[45] Date of Patent: Jul. 18, 1995

[54] DIGITAL COMMUNICATION SYSTEM

[75] Inventors: Tohru Kazawa, Kokubunji; Takanori Miyamoto, Fuchu; Katsuyuki Miyazaki, Yokohama, all of Japan

[73] Assignee: Hitachi, Ltd., Tokyo, Japan

[21] Appl. No.: 4,390

[22] Filed: Jan. 14, 1993

[30] Foreign Application Priority Data

Jan. 24, 1992 [JP] Japan .................. 4-010765

[51] Int. Cl.6 ............................................. H04L 5/12
[52] U.S. Cl. .................... 375/262; 375/290; 375/341; 371/43; 371/55
[58] Field of Search ............... 375/39, 94, 59, 18–20; 371/43, 44, 45, 55, 56; 341/67

[56] References Cited

U.S. PATENT DOCUMENTS

| 4,677,625 | 6/1987 | Betts et al. | 375/39 |
|---|---|---|---|
| 5,040,191 | 8/1991 | Forney, Jr. et al. | 375/39 |
| 5,113,411 | 5/1992 | Yoshida et al. | 375/94 |
| 5,243,627 | 9/1993 | Betts et al. | 375/39 |
| 5,287,374 | 2/1994 | Parr | 371/43 |
| 5,287,385 | 2/1994 | Supawara et al. | 375/12 |

FOREIGN PATENT DOCUMENTS 2-67851 3/1990 Japan .

Primary Examiner—Stephen Chin
Assistant Examiner—T. Ghebretinsae
Attorney, Agent, or Firm—Kenyon & Kenyon

[57] ABSTRACT

A digital communications system suitable for high-speed data transmission includes a transmitter and a receiver providing the ability to selectively switch between multiple coding and decoding methods. The transmitter includes a plurality of trellis coders, each of which performs a different type of coding on a transmission signal. The receiver includes a plurality of Viterbi decoders, corresponding to the different types of coders in the transmitter, for decoding the transmission signal. The receiver also includes a selector for determining which of the decoder outputs to choose from based on the frequency of code violations detected in the transmission signal. The present invention thus provides a flexible apparatus for improving the quality of high-speed data transmissions.

7 Claims, 8 Drawing Sheets

DIGITAL COMMUNICATION SYSTEM

BACKGROUND OF THE INVENTION

The present invention relates to a digital communication system; and more particularly, to a digital communication system which has a transmission speed greater than or equal to several bits per second, and which is suitable for performing high-speed transmission between terminals through an exchange, with a telephone line as a transmission medium.

In a digital communication system employing a telephone line, noise having a large amplitude may be mixed in a digital signal over a length of several bits, so that a burst error occurs in some cases. Several conditions may cause such errors; for example, where an analog line and a digital line are provided in the same telephone cable, the linking pulse or the dial pulse of the analog line, generally having an amplitude in the range of several tens of V to 100 V, leaks into the digital line. Similarly, a high-voltage noise on a power source line adjacent to a telephone cable may leak into the digital line of the telephone cable. In such cases, the amplitude of the burst noise is often much more than that of the input signal (in the range of several hundreds of mV to several V) in the digital line, and the frequency or band width of the signal is approximately equal to that of the noise. Therefore, the burst noise cannot be completely removed through a frequency filter often used for the removal of such noise.

Viterbi decoding is one method previously used to correct errors like those described above. An example in which Viterbi decoding has been applied to a partial response class 4 code (hereinafter, "a PR4 code") is disclosed in JP-A-2-67851. According to this technology, the correlation between symbols which are 2 bits away from each other is added by a $(1-D^2)$ coder, and even 2 bit-continuous errors can be corrected by the Viterbi decoding.

However, in the environment of a private telephone line, impulse noise having a width of about 1 $\mu$s may occur in some cases. This corresponds to a continuous error of 4 bits when performing the 4 Mbps-transmission. Thus, the problem with respect to the impulse noise cannot be solved perfectly by the above-mentioned prior art technology. With respect to this problem, a continuous error of n bits can be corrected by a coder which performs an encode according to the expression "$1-D^n$" (hereinafter, "n-th order $(1-D)$ coder"). However, since a $(1-D^2)$ code has already been widely used, it is not economical to convert all of the existing transmitters and receivers. Moreover, long impulse noise having a width of about 1 $\mu$s occurs only in very limited situations where a line is in a poor noise environment, so that the $(1-D^2)$ code may cope with impulse noise sufficiently in some cases. Thus, the n-th order $(1-D)$ coder where $n \geq 3$ is not necessarily required. Therefore, it is ideal that the function corresponding to the $(1-D^2)$ coder and the function corresponding to the n-th order $(1-D)$ coder (where $n \geq 3$) is selectively used according to the noise condition of the telephone line. To this end, on the transmission side a sender using current technology could select a coding system required for a user according to the state of the line. However, since the decoding system in the receiver must correspond to the coding system in the transmitter, the receiver would have to confirm the coding system every communication by communicating with the sender. Such a handshaking requirement is undesirable for practical use.

SUMMARY OF THE INVENTION

It is an object of the present invention to provide a digital communication system which is capable of selectively utilizing an n-th order $(1-D)$ coder with a high-correcting capability in a line having a poor noise environment, while still utilizing an existing $(1-D^2)$ coder in other situations, with appropriate decoding performed automatically on the receiving end.

In order to attain the above-mentioned object, a digital communication system according to the present invention includes a transmitter having a plurality of trellis coders, suitable for a $(1-D^2)$ code and an n-th order $(1-D)$ code, and a receiver having a plurality of Viterbi decoders corresponding to the $(1-D^2)$ code and the n-th order $(1-D)$ code. In the receiver, the Viterbi decoder which is most suitable for a reception signal is automatically selected based on the frequency of code violations detected in the reception signal. On the transmitting side the suitable trellis coder may be selected by the user, such that where the noise environment is good, the $(1-D^2)$ code is used, and where the noise environment is poor, the n-th order $(1-D)$ code is used. On the receiving end, a violation detection circuit judges the code which is being used at present by monitoring code violations. Then, the Viterbi decoder which is suitable for the code being used at present may be automatically selected. Instead of the detection of code violations, the Viterbi decoder may be selected by monitoring an error rate or a parity error, or by detecting whether or not the frame synchronization is present.

In the above-mentioned solution, a violation detection circuit performs the following operation. First, the circuit monitors whether or not violations of both the $(1-D^2)$ code and the n-th order $(1-D)$ code are present. Where a violation of the $(1-D^2)$ code is detected and a violation of the n-th order $(1-D)$ code is not detected, it may be assumed that the input signal has been subjected to n-th order $(1-D)$ coding. On the other hand, where a violation of the $(1-D^2)$ code is not detected and a violation of the n-th order $(1-D)$ code is detected, it may be assumed that the reception signal has been subjected to the $(1-D^2)$ coding. The specific case where neither violation is detected cannot occur as long as the transmission data is randomized. The specific case where both violations are detected may be caused by a bit error in the transmission line. The frequency of bit error occurrence is originally small, generally at the rate of one per ten thousand bits at the most. Therefore, in counting violations a threshold value may be established assuming the violation occurs at the rate of several times for the transmission of 256 bits, for example within a fixed period of time. Thus, by monitoring code violations, it is possible to determine the nature of the transmission code.

DESCRIPTION OF THE PREFERRED EMBODIMENTS

The preferred embodiments of the present invention are hereinafter described in detail with reference to the accompanying drawings.

Figure 1:
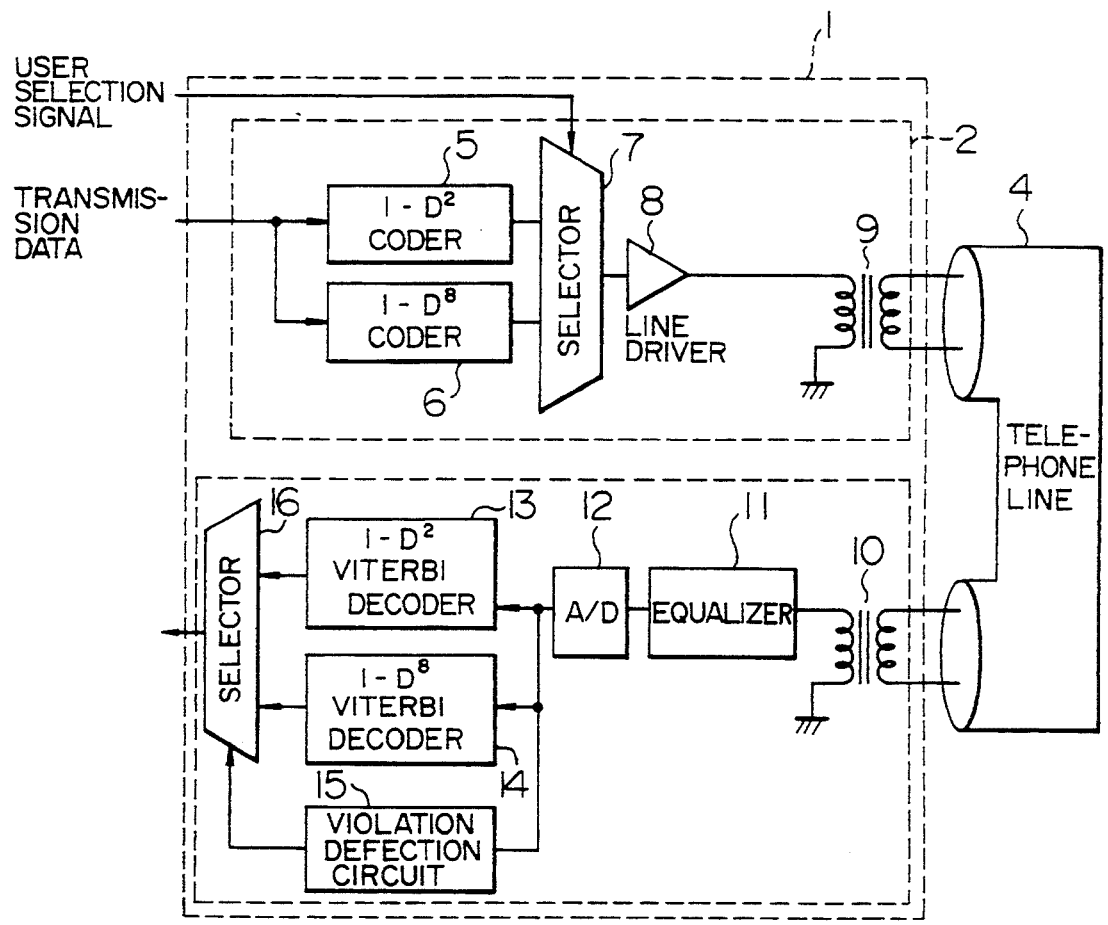
FIG. 1 is a circuit diagram showing a configuration of a system according to a first embodiment of the present invention.

FIG. 1 shows a configuration of a system according to a first embodiment of the present invention. A transmission circuit 1 is made up of a transmitter 2 and a receiver 3. The transmitter 2 includes a plurality of partial response coders (i.e., a $(1-D^2)$ coder 5 and a $(1-D^8)$ coder 6), a selector 7, a line driver 8, and a transformer 9. The receiver 3 includes a transformer 10, an equalizer 11, an analog-to-digital converter 12 (hereinafter, "A/D converter"), a plurality of Viterbi decoders; (i.e., a $(1-D^2)$ Viterbi decoder 13 and a $(1-D^8)$ Viterbi decoder 14), a violation detection circuit 15, and a selector 16. The transmitter 2 and the receiver 3 are connected to each other through a telephone line 4.

The transmission data is coded by both the $(1-D^2)$ coder 5 and the $(1-D^8)$ coder 6. One of the outputs of the $(1-D^2)$ coder 5 and the $(1-D^8)$ coder 6 is selectively outputted from the selector 7 by a selection signal specified by a user. Then, the output signal is sent out through the transformer 9 to one end of the telephone line 4 by the current supplied from the line driver 8. The signal provided at the other end of the telephone line 4 is received through the transformer 10 by the equalizer 11, and then any distortion thereof which occurred during the transmission is corrected by the equalizer 11. The signal which has passed through the equalizer 11 is digitized by the A/D converter 12. The digital output signals of the A/D converter 12 are decoded by both the $(1-D^2)$ Viterbi decoder 13 and the $(1-D^8)$ Viterbi decoder 14. The selector 16 selectively outputs selectively one of the decoding results of the plurality of Viterbi decoders under the control of the violation detection circuit 15. The violation detection circuit 15 detects the violation of each of the $(1-D^2)$ code and the $(1-D^8)$ code. Where a violation of the $(1-D^2)$ code is detected and the violation of the $(1-D^8)$ code is not detected, the violation detection circuit 15 controls the selector 16 in such a way that the decoding result of the $(1-D^8)$ Viterbi decoder 14 is sent to the user. On the other hand, where a violation of the $(1-D^2)$ code is not detected and a violation of the $(1-D^8)$ code is detected, the violation detection circuit 15 controls the selector 16 in such a way that the decoding result of the $(1-D^2)$ Viterbi decoder 13 is sent to the user.

Figure 2:
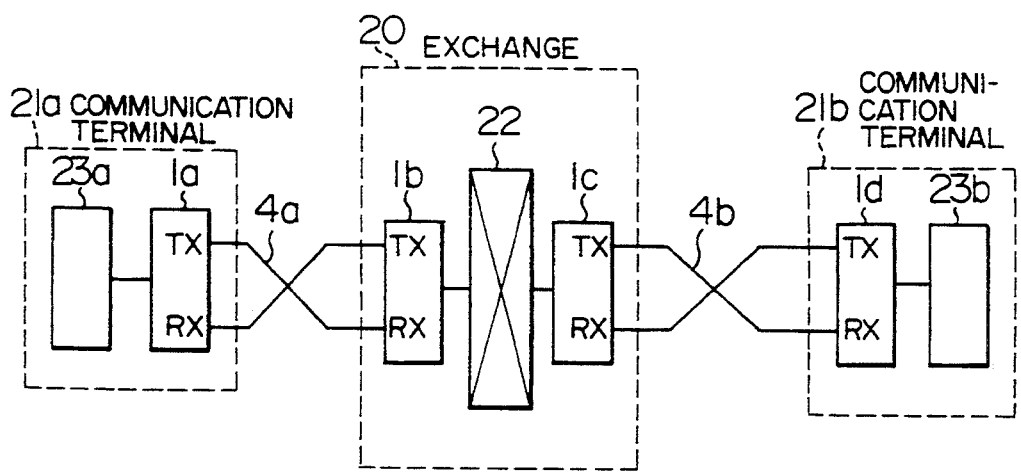
FIG. 2 is a block diagram showing an example in which the present invention is applied to a communication system.

FIG. 2 shows an example in which the present invention is applied to a communication system. An exchange 20 and communication terminals 21a and 21b are connected to one another through telephone lines 4a and 4b, and send or receive high-speed data. A protocol processing circuit 23a provided in the communication terminal 21a produces transmission data in accordance with a user request, and the transmission data thus produced is sent through the telephone line 4a to the exchange 20 by a transmission circuit 1a in the communication terminal 21a. The data received by a transmission circuit 1b in the exchange 20 is read out with the called communication terminal by a switching circuit 22 in the exchange 20, and then is sent through a transmission circuit 1c in the exchange 20 and the telephone line 4b to the corresponding communication terminal 21b. The communication terminal 21b receives the data with its transmission circuit 1d, and the data thus received is processed by a protocol processing circuit 23b.

Figure 3:
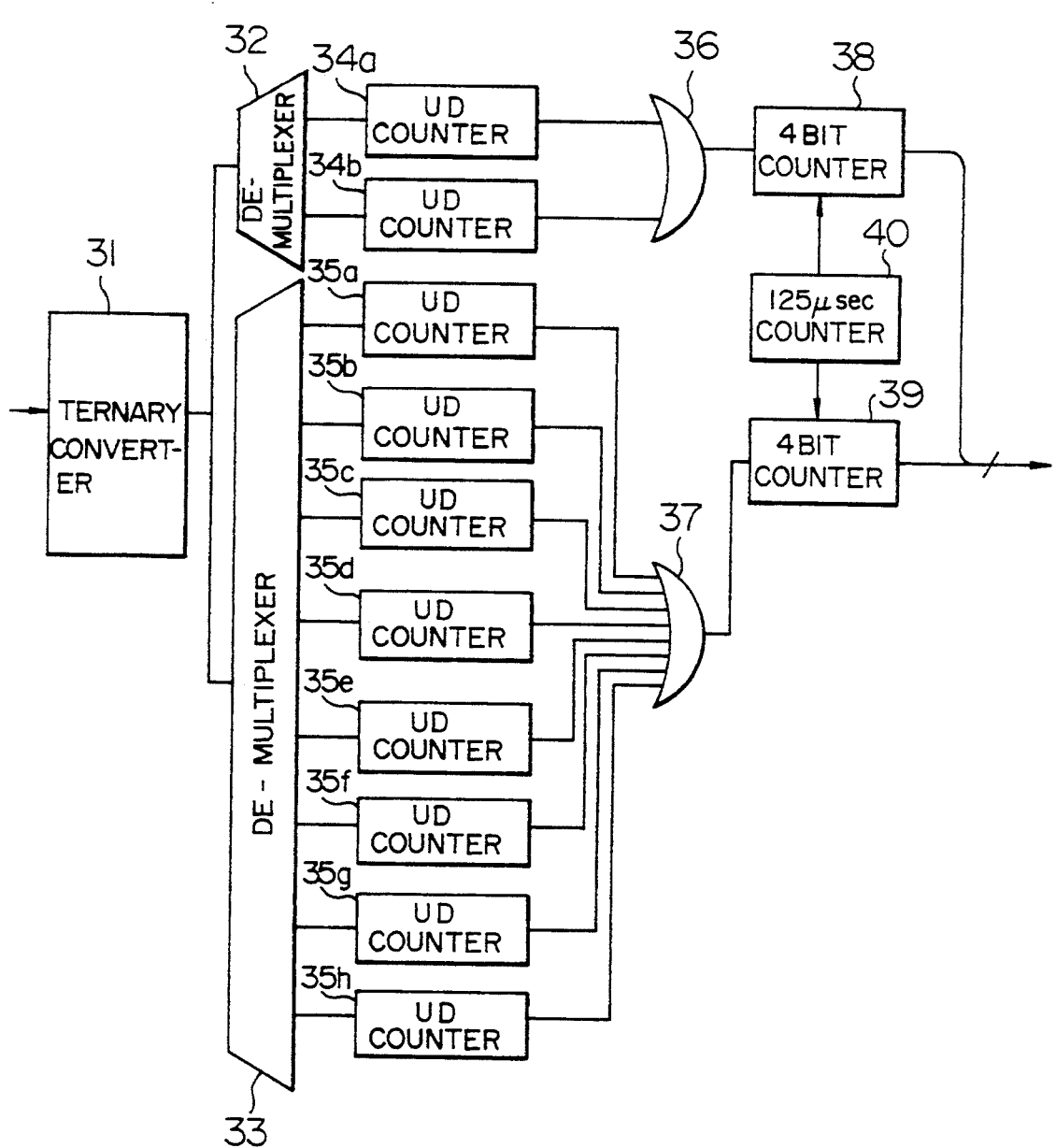
FIG. 3 is a circuit diagram showing an arrangement of a violation detection circuit applied to the first embodiment.

FIG. 3 shows an arrangement of an embodiment of the violation detection circuit 15 which is employed in the present invention. The violation detection circuit 15 includes a ternary converter 31, de-multiplexers 32 and 33, counters 34a, 34b and 35a to 35h, OR gates 36 and 37, 4 bit-counters 38 and 39, and 125 μsec-counter 40.

The ternary converter 31 converts the output of the A/D converter 12 of FIG. 1 into +1, 0 or −1. The de-multiplexer 32 serves to separate the ternary data sequence at intervals of 2 bits to output the resultant data in the form of different two code sequences. This processing corresponds to that of the $(1-D^2)$ code, and is formed by multiplexing the two $(1-D)$ code sequences. That is, the backward processing is performed in the above way by the de-multiplexer 32. Likewise, the de-multiplexer 33 separates the ternary data sequence at intervals of 8 bits to output the resultant data in the form of eight different code sequences. This processing corresponds to that of the $(1-D^8)$ code, and is formed by multiplexing the eight $(1-D)$ code sequences. Each of the counters 34 and 35 is a +1 bit-counter which operates to increment the count when +1 is inputted, decrement the count when −1 is inputted, and perform no operation when 0 is inputted, and to be reset prior to the counting operation when the sign of the input signal is inverted. Thus, each of the counters 34 and 35 can detect a $(1-D)$ code rule violation on the basis of the occurrence of an overflow or an underflow. If the received code is $(1-D^8)$, the violation is necessarily detected by one of the counters 35a to 35h. On the other hand, if the received code is $(1-D^2)$, the violation is necessarily detected by one of the counters 34a and 34b. The detection results are collected by the gates 36 and 37, and the two outputs of the gates 36 and 37 are counted by the 4 bit-counters 38 and 39, respectively. That is, the violation of the $(1-D^2)$ code and that of the $(1-D^s)$ code are counted by the counters 38 and 39, respectively. The 125 μsec-counter 40 resets both counters 38 and 39 every 125 μsec. Therefore, the output of the counter out of the counters 38 and 39 becomes ON, which counts the sixteen or more violations for 125 μsec. This acts as a protection circuit for preventing malfunctions of the code judgement due to noise and the like. Moreover, the case where both the outputs of the counters 38 and 39 become ON can occur until the bit error rate has increased up to about 10/sec. As a result, the corresponding Viterbi decoder is selected on the basis of the output signals of the counters 38 and 39.

Figure 4:
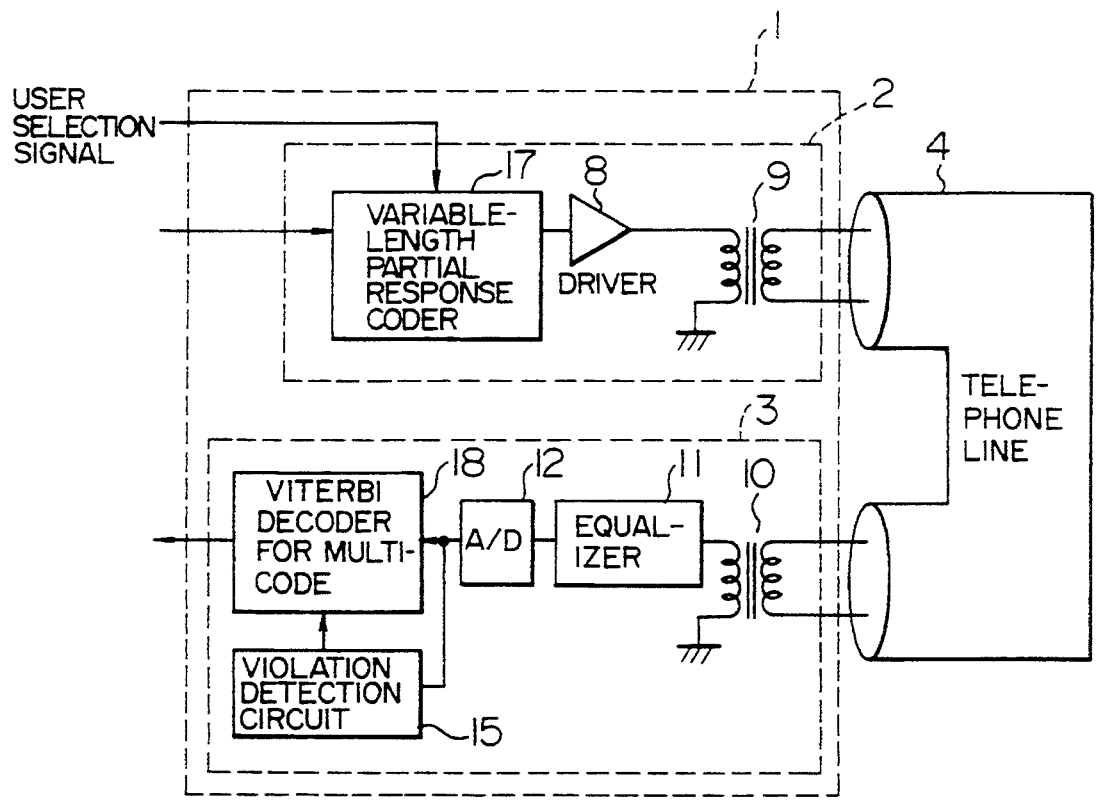
FIG. 4 is a circuit diagram showing a configuration of a system according to a second embodiment of the present invention.

FIG. 4 shows a configuration of a system according to a second embodiment of the present invention. A transmission circuit 1 is made up of a transmitter 2 and a receiver 3. The transmitter 2 includes a variable-length partial response coder 17, a line driver 8, and a transformer 9. The receiver 3 includes a transformer 10, an equalizer 11, an A/D converter 12, a multi-code Viterbi decoder 18, and a violation detection circuit 15. Moreover, the transmitter 2 and the receiver 3 are connected to each other through a telephone line 4. The difference between this second embodiment and the first embodiment is that a plurality of prior art coders and a plurality of Viterbi decoders are not provided; instead, only a single coder and a single Viterbi decoder are provided to process the different codes. Thus, the number of constituent elements can be reduced.

Figure 5:
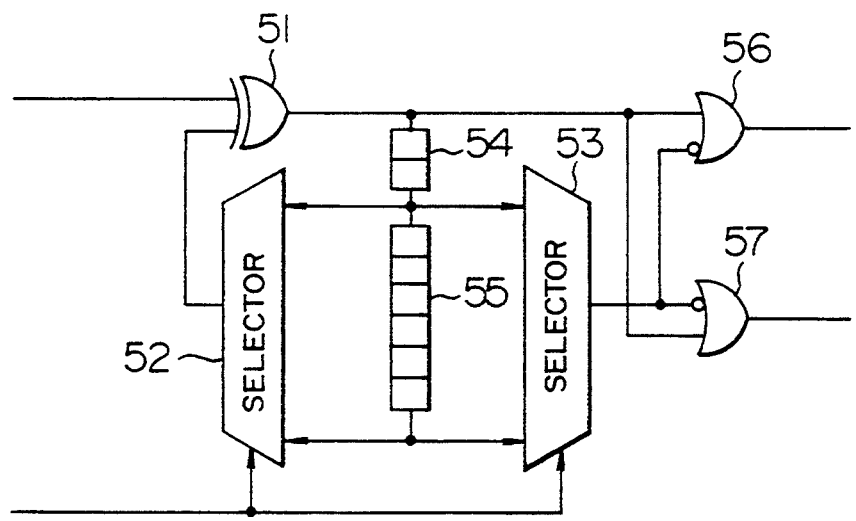
FIG. 5 is a circuit diagram showing an arrangement of a partial response coder as applied to the second embodiment.

FIG. 5 shows an arrangement of an embodiment of the variable-length partial response coder 17 employed in the second embodiment. The present variable-length partial response coder 17 is made up of an EXOR gate 51, selectors 52 and 53, shift registers 54 and 55, and gates 56 and 57.

Where the selectors 52 and 53 selectively output the output signal of the shift register 54, the EXOR gate 51 and the shift register 54 serve as a $(1-D^2)$ precoder. The shift register 54, and the gates 56 and 57 may also serve as a $(1-D^2)$ coder. Moreover, where each of the selectors 52 and 53 selectively output the output signal of the shift register 55, the EXOR gate 51 and the shift registers 54 and 55 serve as a $(1-D^8)$ coder. The registers 54 and 55, and the gates 56 and 57 may also serve as a $(1-D^8)$ coder. As a result, the arithmetic circuit which is commonly provided in a plurality of coders may be shared with the number of elements required.

Figure 6:
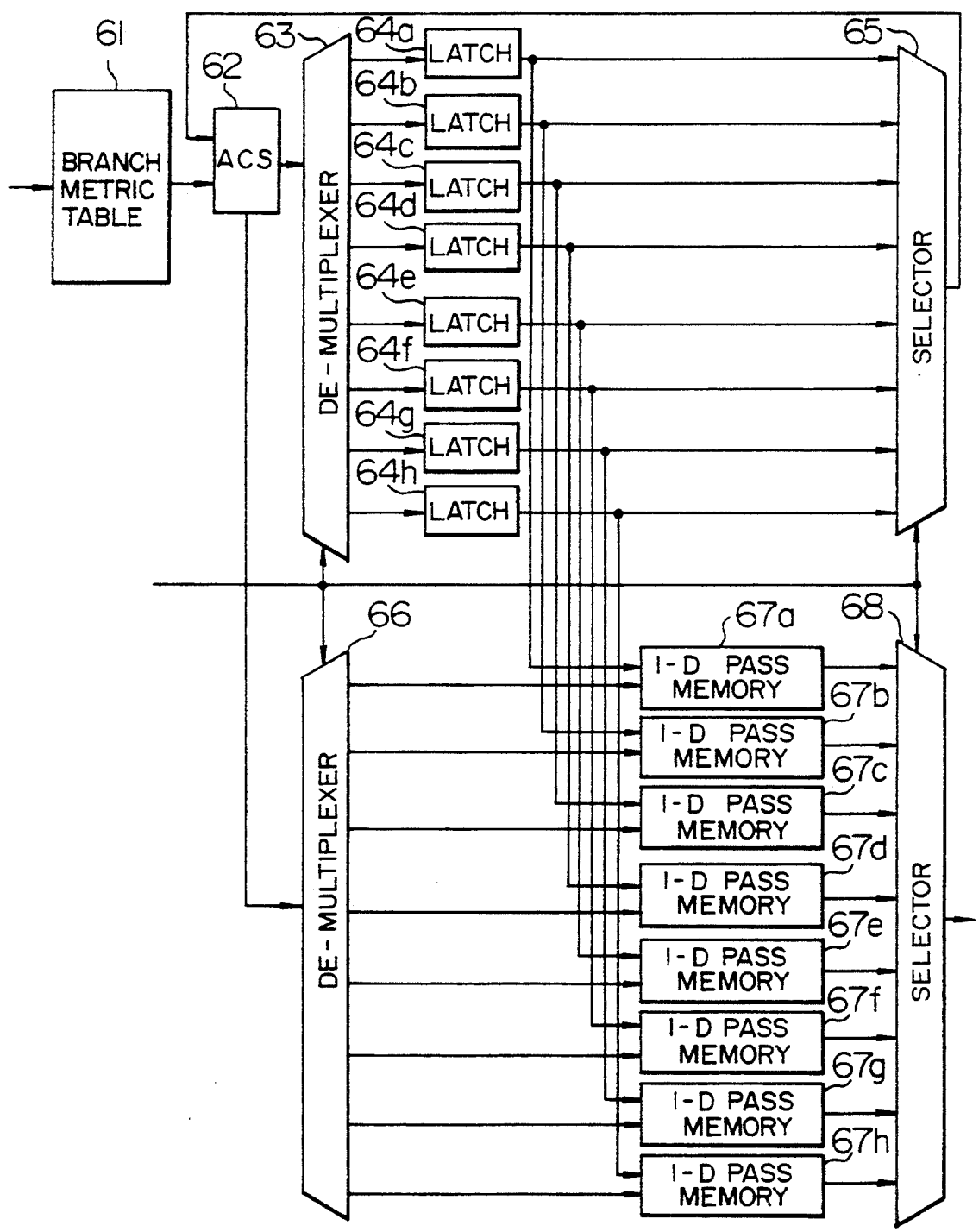
FIG. 6 is a block diagram showing an arrangement of a Viterbi decoder as applied to the second embodiment.

FIG. 6 shows an arrangement of an embodiment of the multi-code Viterbi decoder 18 employed in the second embodiment. The present multi-code Viterbi decoder 18 includes a branch metric table 61, an ACS (Add Compare-Select Circuit) 62, de-multiplexers 63 and 66, a latch 64, selectors 65 and 68, and a $(1-D)$ pass memory 67. A 4-bit input signal is inputted to the branch metric table 61, and then a probability corresponding to a true reception point $(+1, 0, -1)$ is read out. Using this probability (branch metric), the ACS 62 and the pass memory 67 output a maximum likelihood sequence as the reception data. Then, the Viterbi decoder for the $(1-D^2)$ code is realized by alternately operating the two ACSs and the two $(1-D)$ pass memories which correspond to the $(1-D)$ code. Likewise, the Viterbi decoder for the $(1-D^8)$ code is realized by sequentially operating the eight ACSs and the eight $(1-D)$ pass memories which correspond to the $(1-D)$ code. In the present embodiment, ACS 62 is used in common, and eight latches 64 are provided to store the calculation results from the ACS in sequence, thus achieving the same result as where parallel ACSs are operated. In the decoding of the $(1-D^2)$ code, only the inputs and outputs of the latches 64a and 64b and the pass memories 67a and 67b are alternately switched by the de-multiplexers 63 and 66 and the selectors 65 and 68, so that the latches 64a and 64b and the pass memories 67a and 67b act as a $(1-D^2)$ decoder. Similarly, in the decoding of the $(1-D^8)$ code, the inputs and outputs of the latches 64a to 64h and the pass memories 67a to 67h are switched in sequence by the de-multiplexers 63 and 66 and the selectors 65 and 68, so that the latches 64a to 64h and the pass memories 67a to 67h act as a $(1-D^8)$ Viterbi decoder. Thus, in the same manner as in the coder, the arithmetic circuit which is commonly provided in a plurality of Viterbi decoders can be shared, again effectively reducing the number of elements required.

Figure 7:
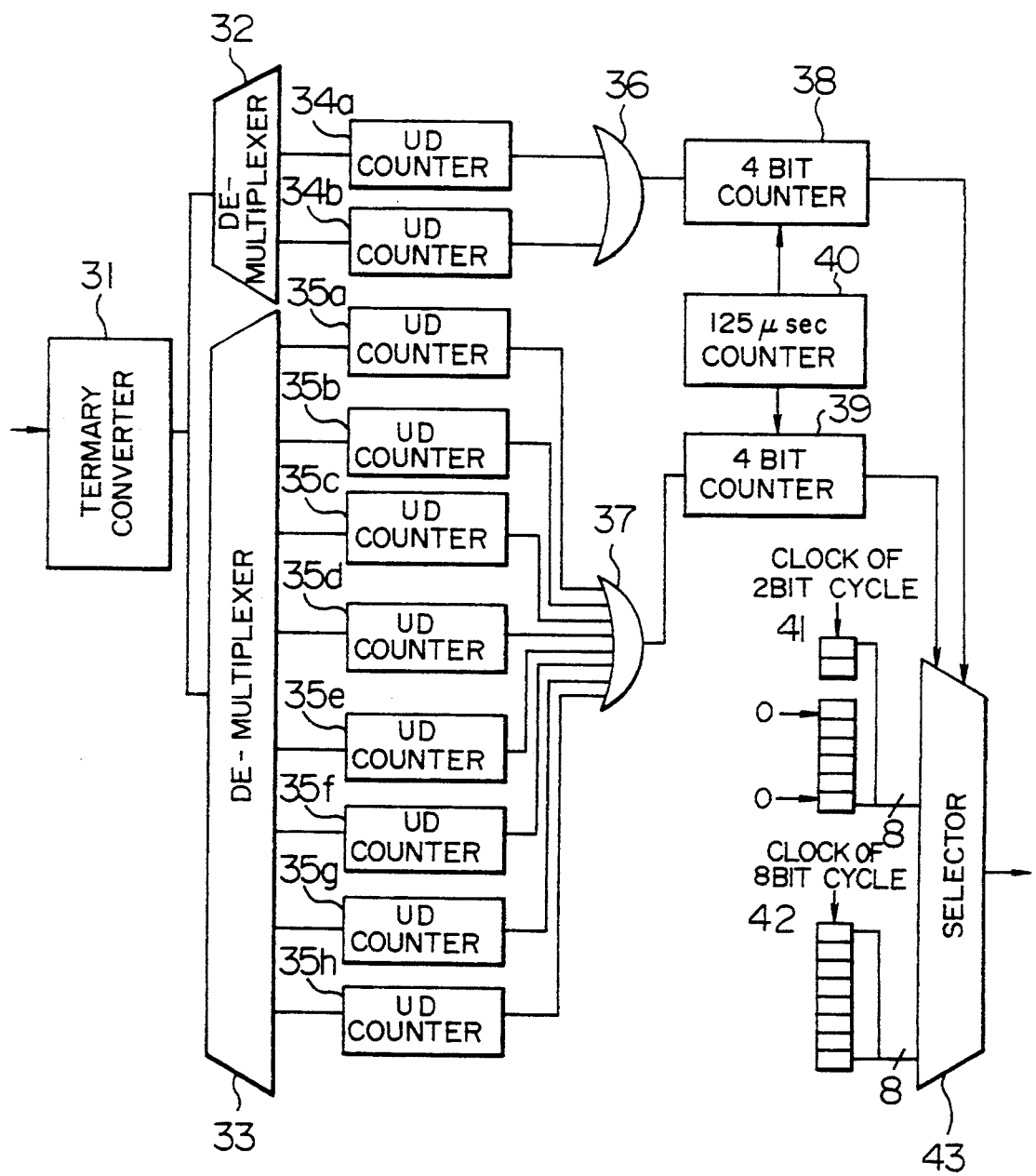
FIG. 7 is a circuit diagram showing an arrangement of a violation detection circuit as applied to the second embodiment.

FIG. 7 shows an arrangement of an embodiment of the violation detection circuit 15 employed in the second embodiment. The violation detection circuit 15 includes a ternary converter 31, de-multiplexers 32 and 33, counters 34 and 35, OR gates 36 and 37, 4 bit-counters 38 and 39, a 125 μsec-counter 40, shift registers 41 and 42, and a selector 43. The operation of this violation detection circuit is substantially the same as in the circuit shown in FIG. 3. However, in this case the shift registers 41 and 42 and the selector 43 are added to produce the control signals for the de-multiplexers 63 and 66 and the selectors 65 and 68, which are provided in the multi-code Viterbi decoder 18.

Figure 8:
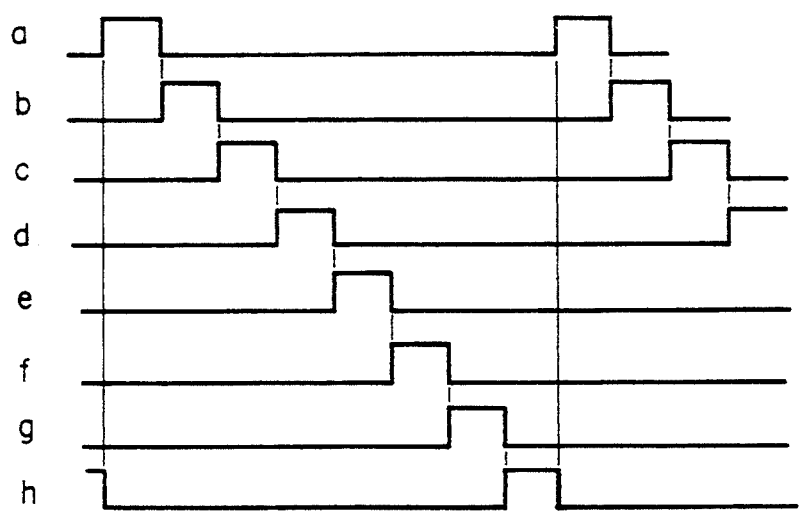
FIG. 8 is a time chart showing an output of the violation detection circuit shown in FIG. 7.

FIG. 8 is a time chart showing output signals of the violation detection circuit shown in FIG. 7. This figure shows the output signals of the violation detection circuit in the operation of decoding a $(1-D^8)$ code. When a signal a is at a high level, the de-multiplexers 63 and 66 and the selectors 65 and 68 are controlled in such a way that the inputs and outputs of the latch 64a and the pass memory 67a become active. Thus, a set of the latch 64a and the pass memory 67a, a set of the latch 64b and the pass memory 67b, and so on through a set of the latch 64h and the pass memory 67h are operated in sequence.

Figure 9:
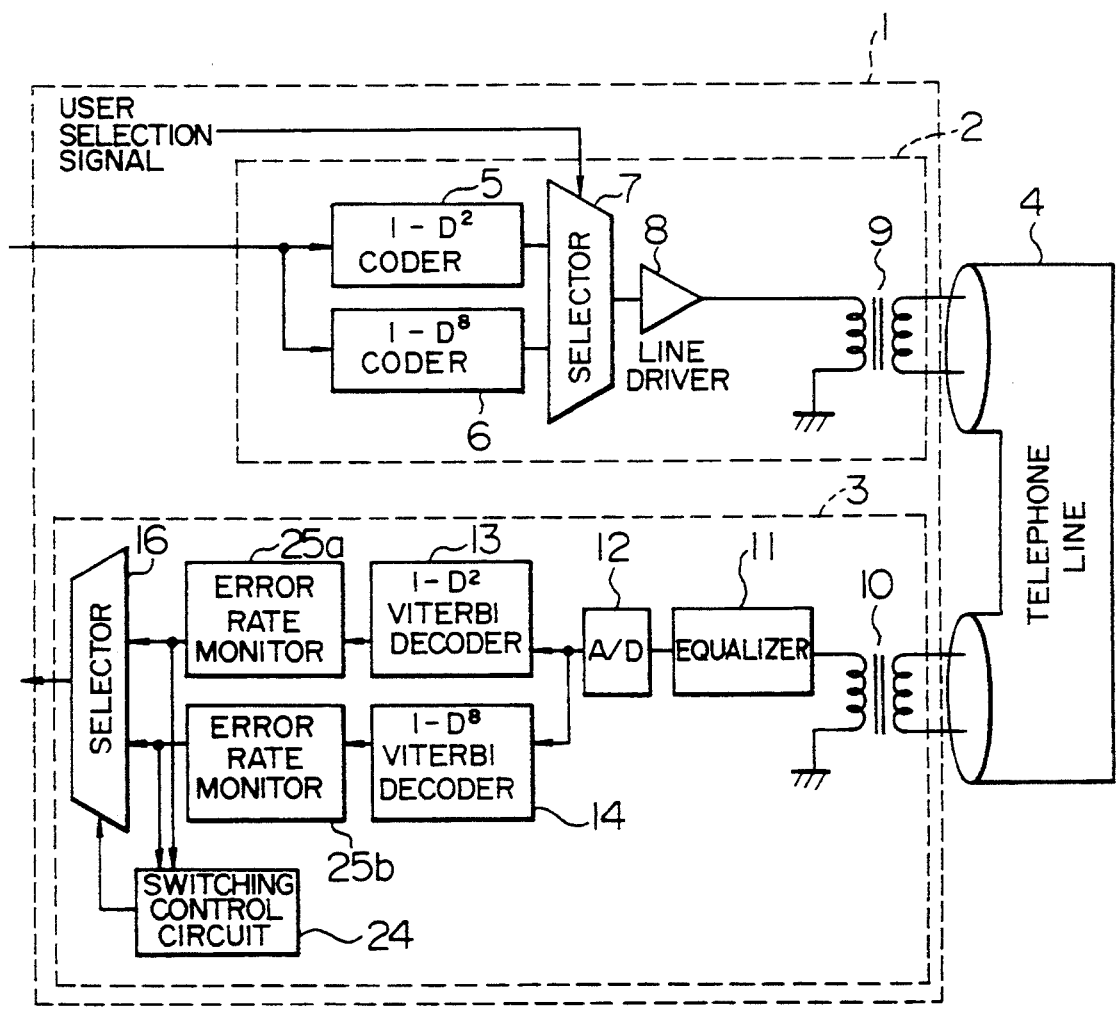
FIG. 9 is a circuit diagram showing a configuration of a system according to a third embodiment of the present invention.

FIG. 9 shows a configuration of a system according to a third embodiment of the present invention. The transmission circuit 1 is made up of the transmitter 2 and the receiver 3. The transmitter 2 includes a plurality of partial response coders (i.e., a $(1-D^2)$ coder 5 and a $(1-D^8)$ coder 6), a selector 7, a line driver 8, and a transformer 9. The receiver 3 includes a transformer 10, an equalizer 11, an A/D converter 12, a plurality of Viterbi decoders (i.e., a $(1-D^2)$ Viterbi decoder 13 and a $(1-D^8)$ Viterbi decoder 14), a switching control circuit 24, error rate monitoring circuits 25a and 25b, and a selector 16. The transmitter 2 and the receiver 3 are connected to each other through a telephone line 4.

The transmission data is coded by both the $(1-D^2)$ coder 5 and the $(1-D^8)$ coder 6. Then, one of the outputs of the $(1-D^2)$ coder 5 and the $(1-D^8)$ coder 6 is selectively outputted from the selector 7 according to the selection signal specified by the user. The output signal of the selector 7 is sent through the transformer 9 to one end of the telephone line 4 by the current supplied from the line driver 8. The signal provided at the other end of the telephone line 4 is received through the transformer 10 by the equalizer 11, and then any distortion produced during the transmission is corrected by the equalizer 11. The signal which has passed through the equalizer 11 is then digitized by the A/D converter 12. The digital output signals of the A/D converter 12 are decoded by the $(1-D^2)$ Viterbi decoder 13 and the $(1-D^8)$ Viterbi decoder 14. Both the decoded data signals are checked by the error rate monitoring circuits 25a and 25b, respectively. Then, the decoded data signal having the fewest errors is outputted from the selector 16 under the control of the switching control circuit 24.

Figure 10:
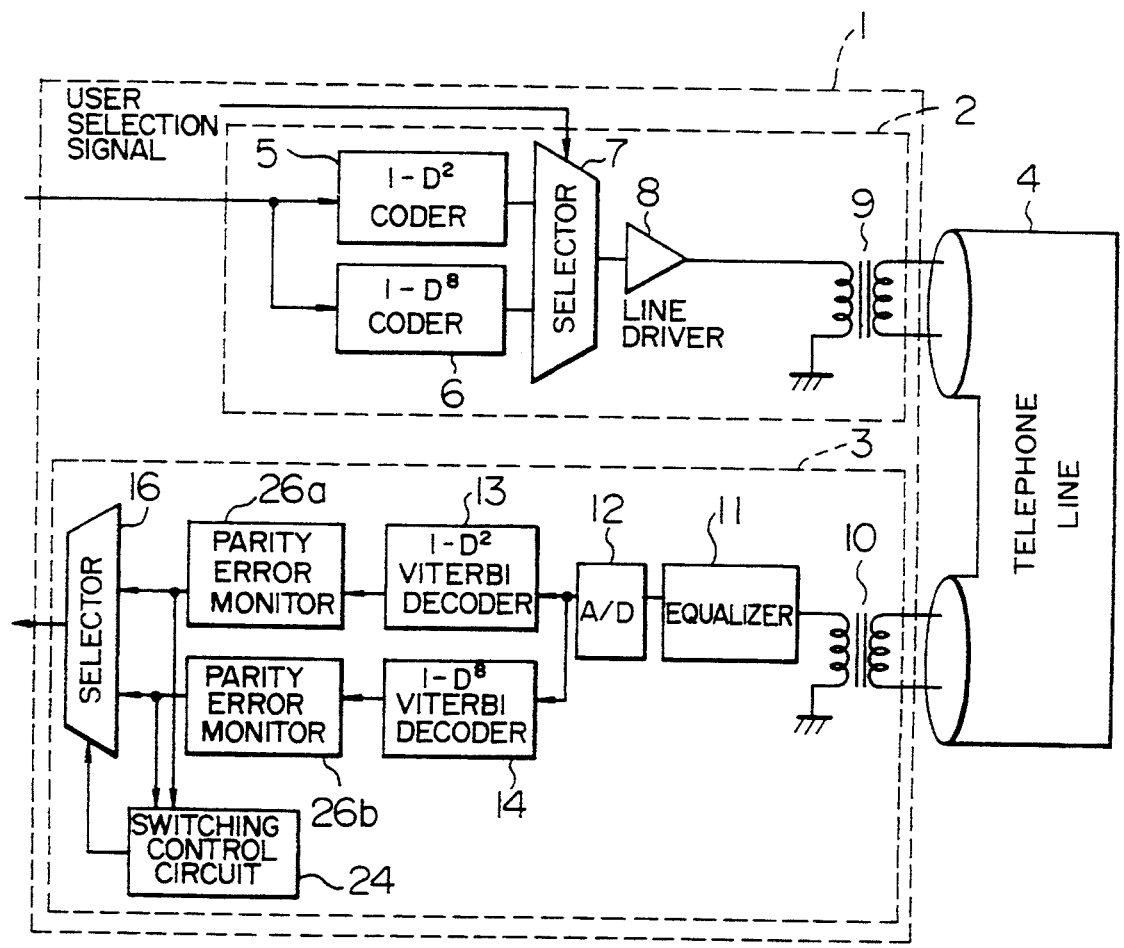
FIG. 10 is a circuit diagram showing a configuration of a system according to a fourth embodiment of the present invention.

FIG. 10 shows a configuration of a system according to a fourth embodiment of the present invention. A transmission circuit 1 is made up of a transmitter 2 and a receiver 3. The transmitter 2 includes a plurality of partial response coders (i.e., a $(1-D^2)$ coder 5 and a $(1-D^8)$ coder 6), a selector 7, a line driver 8, and a transformer 9. The receiver 3 includes a transformer 10, an equalizer 11, an A/D converter 12, a plurality of Viterbi decoders (i.e., a $(1-D^2)$ Viterbi decoder 13 and a $(1-D^8)$ Viterbi decoder 14), a switching control circuit 24, parity error monitoring circuits 26a and 26b, and a selector 16. Moreover, the transmitter 2 and the receiver 3 are connected to each other through a telephone line 4.

The transmission data is coded by both the $(1-D^2)$ coder 5 and the $(1-D^8)$ coder 6. Then, one of the outputs of the $(1-D^2)$ coder 5 and the $(1-D^8)$ coder 6 is selectively outputted from the selector 7 according to the selection signal specified by the user. The output signal of the selector 7 is sent through the transformer 9 to one end of the telephone line 4 by the current supplied from the line driver 8. The signal provided at the other end of the telephone line 4 is received through the transformer 10 by the equalizer 11, and any distortion produced during the transmission is corrected by the equalizer 11. The signal which has passed through the equalizer 11 is then digitized by the A/D converter 12. The digital output signals of the A/D converter 12 are decoded by the $(1-D^2)$ Viterbi decoder 13 and the $(1-D^8)$ Viterbi decoder 14. Both the decoded data signals are checked by the parity error monitoring circuits 26a and 26b, respectively. Then, the decoded data signal having the fewest errors is outputted from the selector 16 under the control of the switching control circuit 24.

Figure 11:
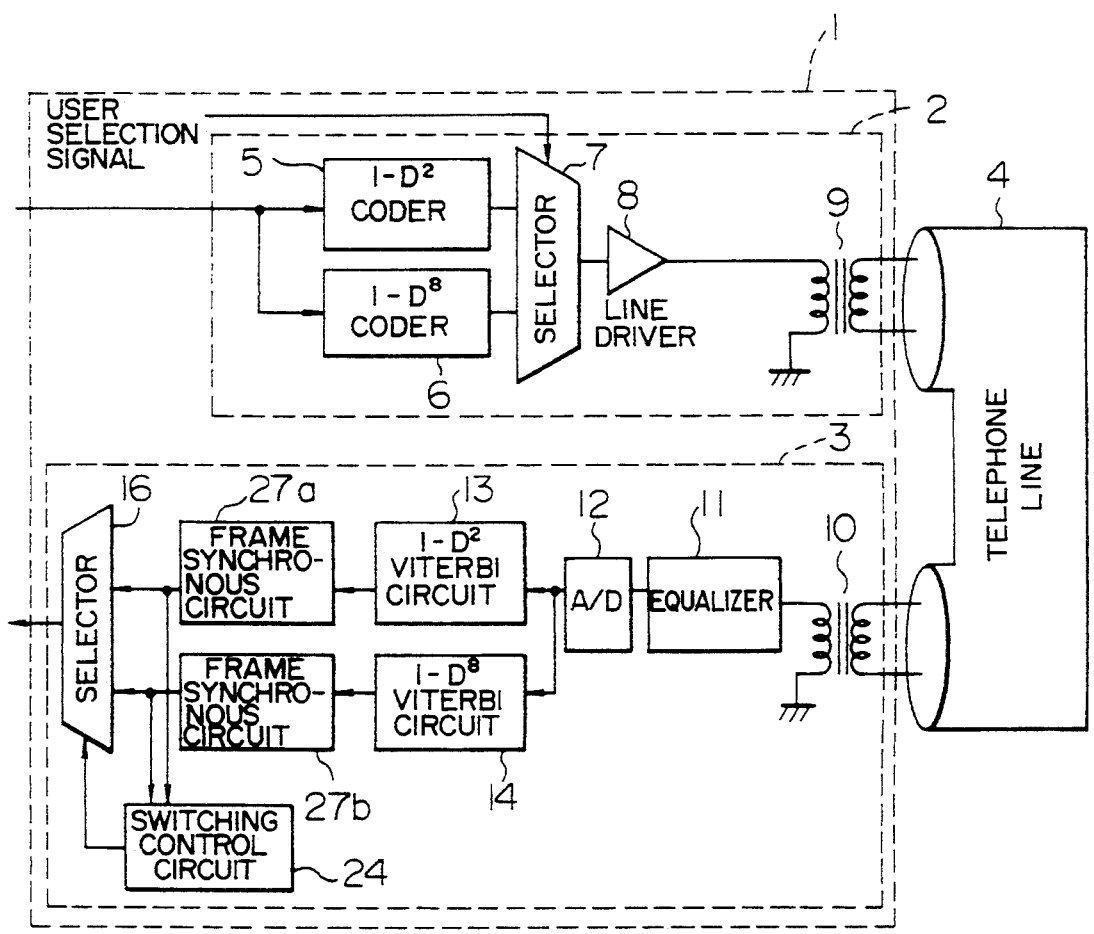
FIG. 11 is a circuit diagram showing a configuration of a system according to a fifth embodiment of the present invention.

FIG. 11 shows a configuration of a system according to a fifth embodiment of the present invention. A transmission circuit 1 is made up of a transmitter 2 and a receiver 3. The transmitter 2 includes a plurality of partial response coders (i.e., a $(1-D^2)$ coder 5 and a $(1-D^8)$ coder 6), a selector 7, a line driver 8, and transformer 9. The receiver 3 includes a transformer 10, an equalizer 11, an A/D converter 12, a plurality of Viterbi decoders (i.e., a $(1-D^2)$ Viterbi decoder 13 and a $(1-D^8)$ Viterbi decoder 14), a switching control circuit 24, frame synchronous circuits 27a and 27b, and a selector 16. Moreover, the transmitter 2 and the receiver 3 are connected to each other through a telephone line 4.

The transmission data is coded by both the $(1-D^2)$ coder 5 and the $(1-D^8)$ coder 6. Then, one of the outputs of the $(1-D^2)$ coder 5 and the $(1-D^8)$ coder 6 is selectively outputted from the selector 7 according to the selection signal specified by the user. The output signal of the selector 7 is sent through the transformer 9 to one end of the telephone line 4 by the current supplied from the line driver 8. The signal provided at the other end of the telephone line 4 is received through the transformer 10 by the equalizer 11, and then any distortion produced during the transmission is corrected by the equalizer 11. The signal which has passed through the equalizer 11 is then digitized by the A/D converter 12. The digital output signals of the A/D converter 12 are decoded by the $(1-D^2)$ Viterbi decoder 13 and the $(1-D^8)$ Viterbi decoder 14. Both the decoded data signals are inputted to the frame synchronous circuits 27a and 27b, respectively. Then, the decoded data signal for which the frame synchronization is more rapidly established is outputted from the selector 16 under the control of the switching control circuit 24.

If the user selects the desired code, the receiver automatically selects the suitable decoder; and therefore, the labor required for the initialization becomes unnecessary.

In a prior art receiver which does not employ Viterbi decoding, a MOD2-decoder is employed for decoding. In general, a pre-coded n-th order $(1-D)$ code is decoded with respect to any value n by the MOD2-decoder. Therefore, in the average noise environment which requires no error correction, the transmitter-receiver of the present invention can communicate with the prior art transmitter-receiver without hindrance.

What is claimed is:

1. A digital communication system including a transmitter and a receiver, wherein:
    said transmitter comprises a plurality of trellis coders corresponding to a code rule represented by a general formula $(1-D^n)$, where n is a unique value for each of said plurality of trellis coders, and
    said receiver comprises a plurality of Viterbi decoders, each of which is associated with a code rule of one of said plurality of trellis coders, a selector for outputting a series of decoded bits corresponding to input from one of said plurality of Viterbi decoders, and a control unit which recognizes a code rule in a received signal and causes said selector to output said series of decoded bits received from a Viterbi decoder associated with said code rule.

2. The digital communication system of claim 1, wherein said control unit determines a number of code violations contained in said received signal for each of a plurality of code rules and causes said selector to output said series of decoded bits from a Viterbi decoder associated with a code rule having a least number of code violations.

3. The digital communication system of claim 1, wherein said control unit determines a number of bit-errors in a series of data decoded by each of said plurality of Viterbi decoders and causes said selector to output said series of decoded bits from a Viterbi decoder associated with a least number of bit-errors.

4. The digital communication system of claim 1, wherein said control unit determines a number of parity-errors in a series of data decoded by each of said plurality of Viterbi decoders and causes said selector to output said series of decoded bits from a Viterbi decoder associated with a least number of parity-errors.

5. The digital communication system of claim 1, wherein said control unit detects establishment of frame-synchronization for a series of data decoded by each of said plurality of Viterbi decoders and causes said selector to output said series of decoded bits from a Viterbi decoder associated with a most rapidly-established frame-synchronization.

6. A digital communication system including a transmitter having a trellis coder and a receiver having a Viterbi decoder, wherein:
    said trellis coder comprises a plurality of shift registers connected in a column, a logical gate, and a selector, wherein each of said shift registers is coupled to said selector, and said selector is coupled to said logical gate, for selectively generating one of a plurality of codes represented by a general formula $(1-D^n)$, where n is a unique value determined by a number of said plurality of shift registers whose output is provided to said selector.

7. A digital communication system including a transmitter having a trellis coder and a receiver having a Viterbi decoder for decoding a code rule having a general formula represented by $(1-D^n)$, said Viterbi decoder comprising a branch metric producing circuit, an Add-Compare-Select circuit, n path memories corresponding to a $(1-D)$ code, n latches, first and second demultiplexers, and first and second selectors, wherein:

said Add-Compare-Select circuit comprises a first input coupled to said branch metric producing circuit, a second input coupled to an output of said first selector, a first output coupled to an input of said first demultiplexer, outputs of which are coupled to inputs of said n latches, and a second output coupled to an input of said second demultiplexer, outputs of which are coupled to inputs of said n path memories, wherein said n latches include outputs coupled to inputs of said first selector, and said n path memories include outputs coupled to inputs of said second selector, and a set of an input and an output of each of said n latches are operated sequentially.

* * * * *

UNITED STATES PATENT AND TRADEMARK OFFICE
CERTIFICATE OF CORRECTION

PATENT NO. : 5,434,886
DATED : July 18, 1995
INVENTOR(S) : Tohru Kazawa, et al.

It is certified that error appears in the above-indentified patent and that said Letters Patent is hereby corrected as shown below:

| Column | Line | |
|---|---|---|
| 1 | 68 | After "system" insert --for--. |
| 3 | 41 | After "ers" delete ";". |
| 3 | 60 | Delete "selec-". |
| 3 | 61 | Delete "tively". |
| 4 | 36 | Change "different two" to --two different-- |
| 4 | 62 | Change "(1-D$^s$)" to --(1-D$^8$)--. |
| 4 | 65 | Change "put" to --puts--; delete "the counter out of". |

Signed and Sealed this

Thirtieth Day of January, 1996

Attest:

BRUCE LEHMAN

Attesting Officer     Commissioner of Patents and Trademarks